(12) United States Patent
Leonard

(10) Patent No.: US 8,018,748 B2
(45) Date of Patent: Sep. 13, 2011

(54) METHOD AND SYSTEM TO CONVERT DIRECT CURRENT (DC) TO ALTERNATING CURRENT (AC) USING A PHOTOVOLTAIC INVERTER

(75) Inventor: John Andrew Leonard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 538 days.

(21) Appl. No.: 11/939,940

(22) Filed: Nov. 14, 2007

(65) Prior Publication Data

US 2009/0121549 A1    May 14, 2009

(51) Int. Cl.
*H02M 7/44* (2006.01)
(52) U.S. Cl. ...................................................... 363/95
(58) Field of Classification Search .................... 363/60, 363/71, 95, 127, 131; 307/52; 340/635; 700/286; 323/222, 282, 284, 906
See application file for complete search history.

(56) References Cited

U.S. PATENT DOCUMENTS

| 5,747,967 | A  | * | 5/1998  | Muljadi et al. ................ 320/148 |
| 5,801,519 | A  | * | 9/1998  | Midya et al. .................. 323/222 |
| 5,892,354 | A  | * | 4/1999  | Nagao et al. .................. 323/299 |
| 6,362,540 | B1 | * | 3/2002  | Hill ................................... 307/52 |
| 6,838,611 | B2 | * | 1/2005  | Kondo et al. ................. 136/244 |
| 7,099,169 | B2 | * | 8/2006  | West et al. ..................... 363/132 |
| 7,126,294 | B2 | * | 10/2006 | Minami et al. ................ 318/139 |
| 7,126,314 | B2 | * | 10/2006 | McGinty et al. .............. 323/222 |
| 7,193,872 | B2 | * | 3/2007  | Siri ................................. 363/95 |
| 2007/0012349 | A1 | * | 1/2007  | Gaudiana et al. ............ 136/244 |
| 2007/0252716 | A1 | * | 11/2007 | Burger .......................... 340/635 |
| 2008/0123373 | A1 | * | 5/2008  | Roesner et al. ................ 363/65 |
| 2009/0003024 | A1 | * | 1/2009  | Knaup .......................... 363/124 |

* cited by examiner

*Primary Examiner* — Adolf Berhane
*Assistant Examiner* — Yemane Mehari
(74) *Attorney, Agent, or Firm* — Nixon & Vanderhye P.C.

(57) ABSTRACT

A method to convert direct current (DC) power generated by a photovoltaic (PV) arrays to alternating current (AC) power using a PV inverter, the method includes: applying the DC power generated the PV array to the PV inverter; boosting the DC power from the PV array from a predetermined voltage level to a predetermine DC link voltage, wherein the PV array is regulated by the boosting to output a voltage at the predetermined voltage level; converting the boosted DC power to AC power, and disabling the boost of the power generated by the PV array after the array has a predetermined voltage level at least as great as the DC link voltage.

21 Claims, 5 Drawing Sheets

METHOD AND SYSTEM TO CONVERT DIRECT CURRENT (DC) TO ALTERNATING CURRENT (AC) USING A PHOTOVOLTAIC INVERTER

BACKGROUND OF THE INVENTION

The present invention relates to power generation using photovoltaic (PV) cells, and particularly to converting the direct electrical current (DC) power generated by PV cells to alternating electrical current (AC) used by many power distribution grids and electrical appliances.

PV cells are arranged in an array (referred to as a "PV array"), such as a flat panel array. The DC power generated by the cells in an array is discharged from the array through a common power outlet of the array. Each PV array has a maximum power point (MPP) and corresponding voltage point (Vmpp) at which the array produces maximum power. The MPP and Vmpp varies with the amount of sunlight reaching the PV array. For example, the MPP and Vmpp may vary slowly throughout the day as the sun rises and sets. The MPP and Vmpp can vary quickly as clouds reduce the sunlight reaching a PV array. Operating the PV arrays at their MPP and Vmpp increases the operating efficiency of the array and guarantee maximum output of the arrays. However, the output power and output voltage of an array must be regularly adjusted to track the changes in MPP and Vmpp due to variations in the sunlight reaching the array.

The DC power generated by a PV array is converted to AC power using a DC to AC (DC-AC) converter that includes PV inverters and/or static power converters (SPCs). The PV arrays are electrically connected to the PV inverters of the DC-AC converters. Each PV inverter may receive DC power from one or more independent PV arrays. Multiple input PV inverters are being developed accommodate PV arrays facing in different directions, e.g. for both East and West roof orientations for PV arrays.

Commercial PV inverters may achieve DC to AC conversion efficiencies in excess of 94% and accommodate multiple photovoltaic arrays. To achieve high efficiencies, the PV inverters preferably operate the PV arrays at their Vmpp. The PV inverters track the changing Vmpp for their respective PV arrays and regulate the output voltage of each array to preferably be at the Vmpp for each array.

The PV inverters also boost the incoming voltage from the PV arrays to a higher voltage level suitable for the inversion needed to generated the predetermined AC voltage. Boosting the voltage of a PV array results in a power loss and a reduction in the efficiency of the PV inverter. There is a long felt need to increase the efficiencies of DC-AC converters for PV arrays and, particularly, minimize the loss of efficiency resulting from boosting the PV arrays.

BRIEF DESCRIPTION OF THE INVENTION

A method has been developed to increase the pv inverter efficiency by disabling the DC-DC Boost (PV output voltage to PV Inverter DC Link Voltage). The method includes: applying the DC power generated by the PV array to the PV inverter; boosting the DC power from the PV array from a predetermined voltage level (Vmpp) to a predetermine DC link voltage (the voltage required to connect to the AC Grid), wherein the PV array is regulated by the boosting to output a voltage at the predetermined voltage level (Vmpp); converting the boosted DC power to AC power, and disabling the boost of the power generated by the PV array after the array has a predetermined voltage level (Vmpp) at least as great as the DC link voltage required to connect to the AC Grid.

A method to convert direct current (DC) power generated by a plurality of photovoltaic (PV) arrays to alternating current (AC) power using a PV inverter having a DC boost circuit for each of the PV arrays and a DC to AC inverter, the method comprising: applying the DC power generated by each PV array to a respective input to the PV inverter; operating each PV array at a maximum power voltage corresponding to a maximum power output of the array to produce DC power; determining a duty cycle for each PV Array input which regulates each PV array to output it's maximum power voltage for the array and boosts the maximum power voltage to at least a minimum DC link voltage; applying a duty cycle to each boost circuit to boost the DC power from the array connected to the boost circuit from the maximum power voltage of the array to at least the minimum DC link voltage; converting the boosted DC power to AC power, and disabling the boost circuit connected to a PV array having a maximum power voltage at least as great as the minimum DC link voltage.

A photovoltaic inverter has been developed comprising: a plurality of input connections each adapted to receive direct current (DC) power from a photovoltaic array; a separate DC boost circuit electrically connected to each of the input connections, wherein the boost circuit includes at least one switch operated in accordance with a duty cycle; a DC link circuit electrically connected to a DC output from each of the DC boost circuits, wherein the DC link circuit includes a DC to alternating current (AC) inverter and an AC power output adapted to deliver AC power to an AC power grid, and a controller executing processes for: determining a voltage at which each of the photovoltaic arrays connected to an input connection produces a maximum power output; generating the duty cycle for each boost circuit to control at least one switch to cause the PV array to produce the maximum power and the boost circuit to output a predetermined DC link voltage, and disabling one of the boost circuits coupled to a PV array generating a voltage equal to or greater than the predetermined DC link voltage.

A method has been developed to determine, on an ongoing basis, a maximum power point for a photovoltaic array, the method comprising: varying a voltage output of the photovoltaic array over an operating range of voltages for the array; measuring current output from the photovoltaic array as the voltage output is varied over the operating array; using the measured current and the voltage corresponding to the measured current to determine a power output of the array for each of the various voltages in the operating range; selecting a maximum power output from the power outputs in the operating range and designating a corresponding voltage as a voltage at maximum power point (Vmpp) for the array; periodically repeating the prior steps to update Vmpp; operating the photovoltaic array at the Vmpp; dithering the Vmpp by slightly shifting the voltage of the array away from the Vmpp, and if the power output of the array at the shifted voltage is greater than the power output of the array at Vmpp, designating the shifted voltage as the Vmpp.

DETAILED DESCRIPTION OF THE INVENTION

Figure 1:
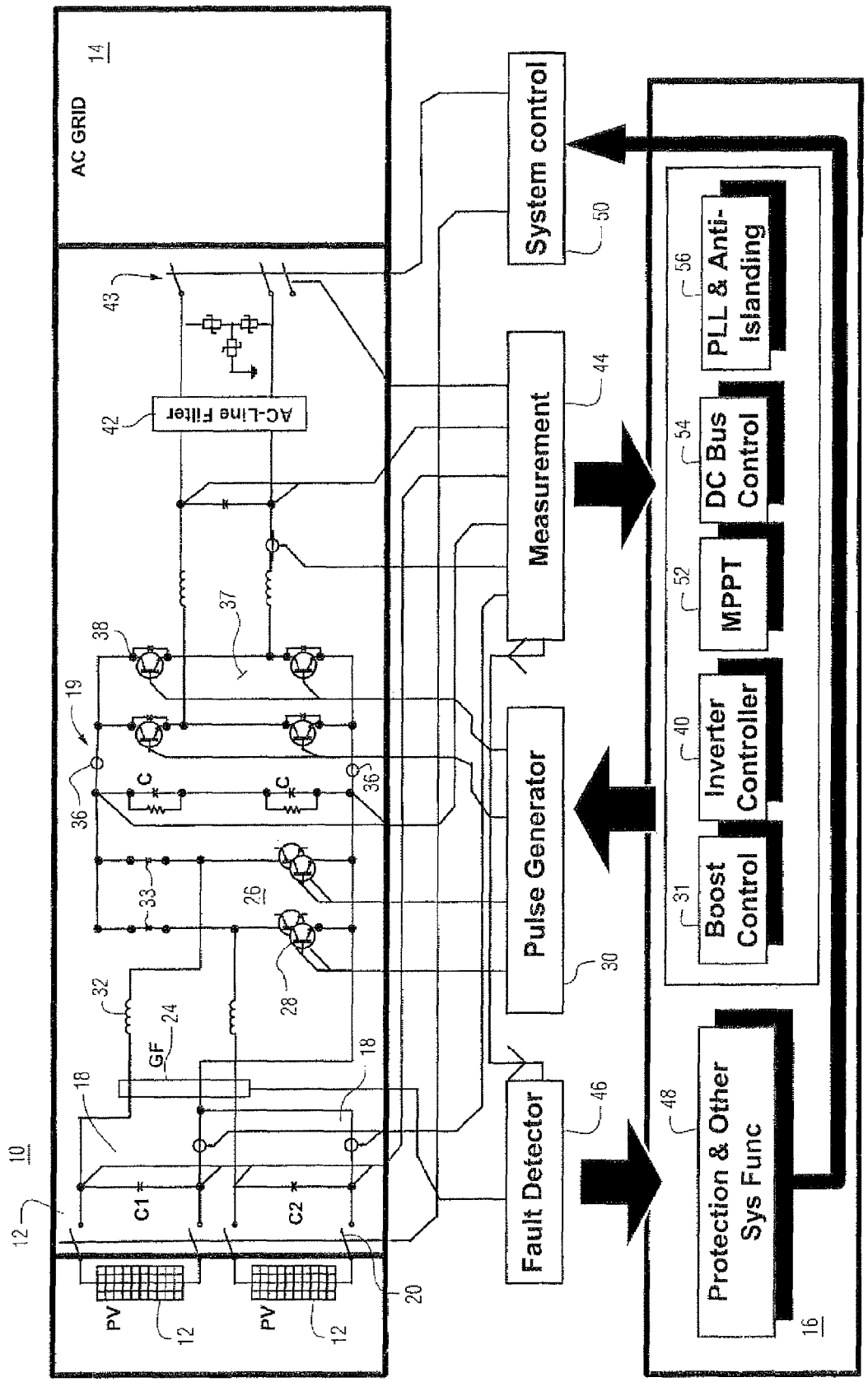
FIG. 1 is a schematic diagram of a photovoltaic (PV) inverter.
Figure 2:
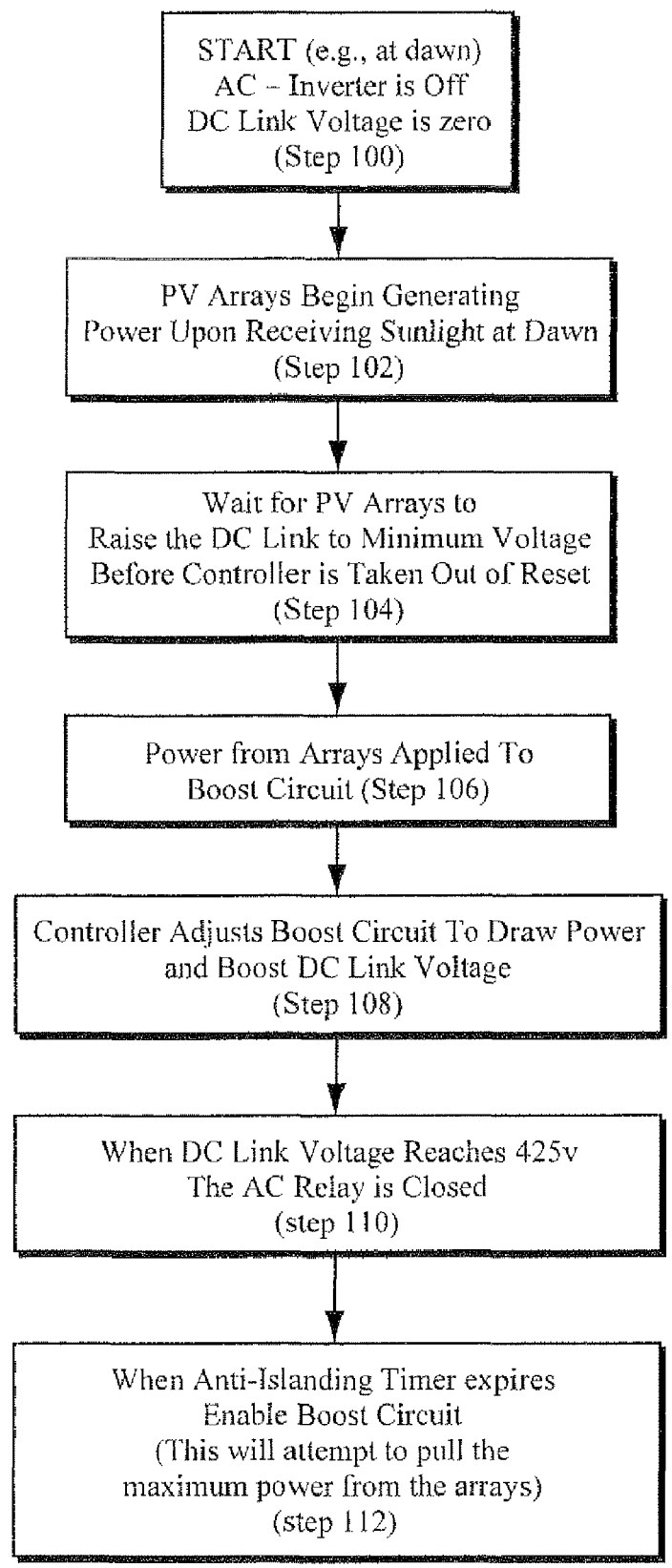
FIGS. 2 to 5 are a flow chart of the operation of a PV inverter.
Figure 3:
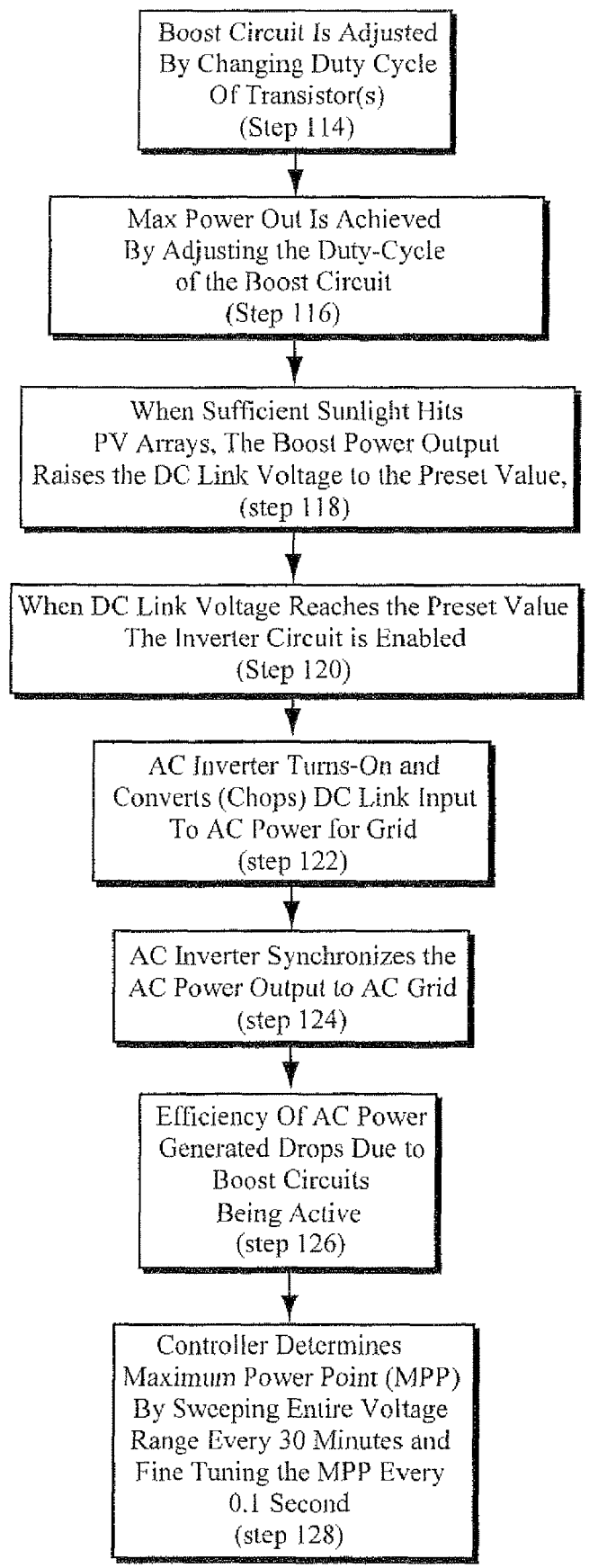
Figure 4:
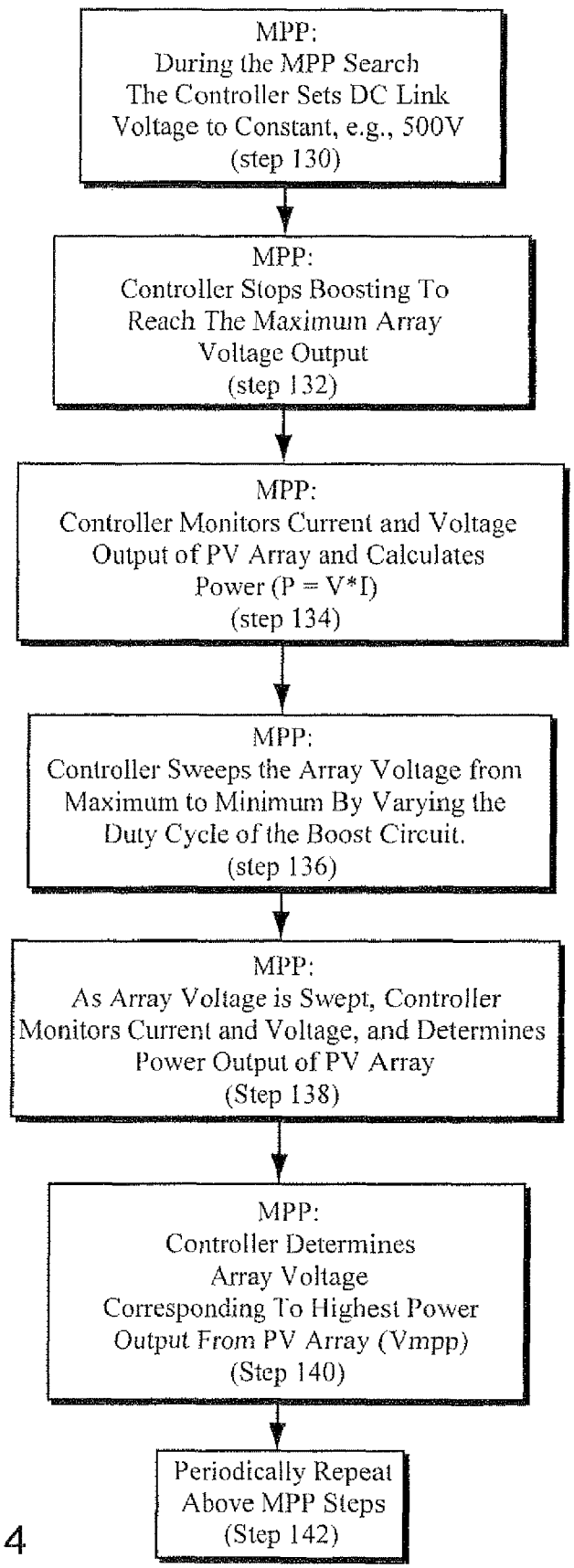
Figure 5:
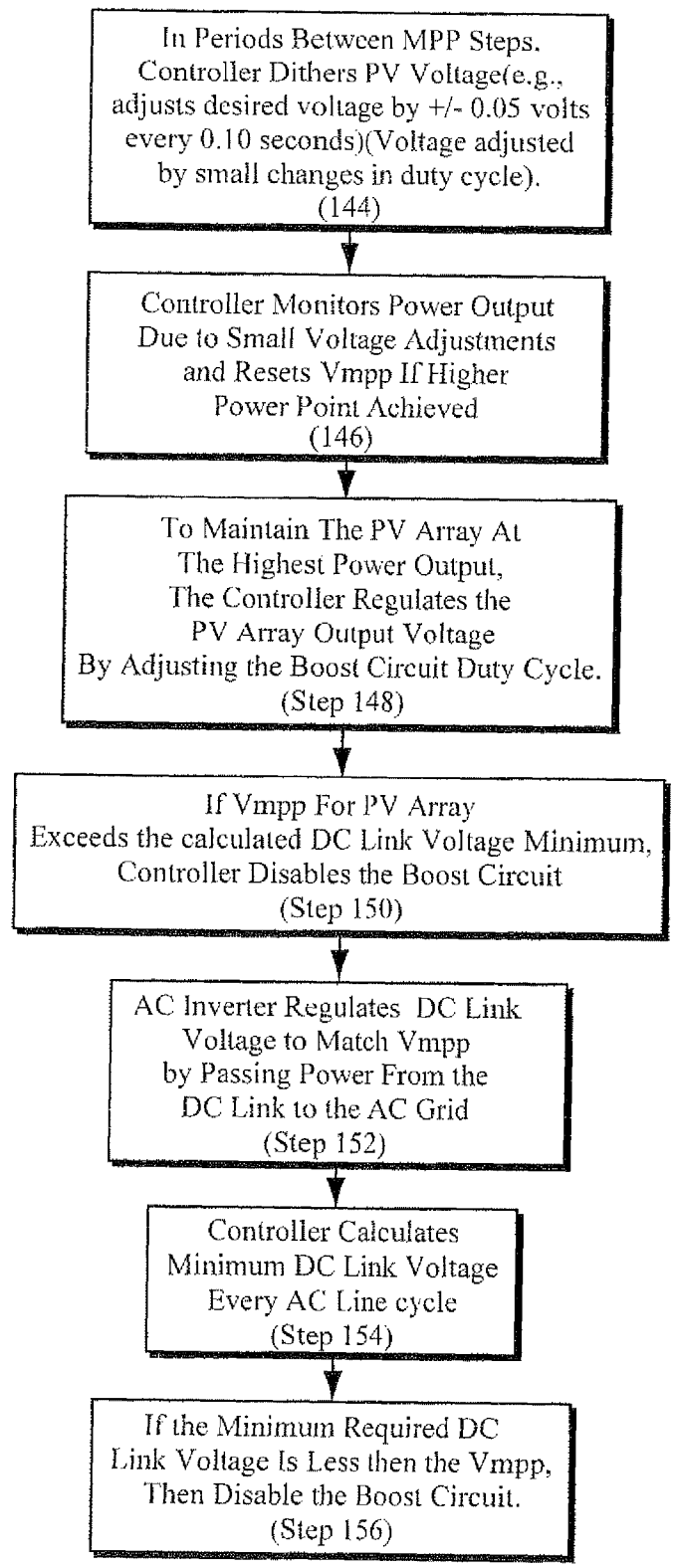

FIG. 1 is a schematic diagram of a photovoltaic (PV) inverter 10, which may also be referred to as a static power converters (SPCs). The direct current (DC) power generated by photovoltaic (PV) arrays 12 is converted to alternating current (AC) power by the PV inverter. The PV inverter receives direct current (DC) power generated by one or more PV arrays 12. The PV inverter 10 converts the DC power to alternating current (AC) power that is output to an electric utility (AC Grid 14) and used locally to power appliances in a home having the inverter and array. Islanding refers to generating power solely for a local site and not providing power to the AC grid.

The conversion from DC to AC power is monitored and controlled by a controller 16 that includes a computer system and software for executing various algorithms and process routines. The PV inverter achieves a high efficiency conversion of DC to AC power by: (i) regularly updating Vmpp and operating the PV arrays at updated Vmpp, (ii) minimizing boosting of the PV array voltages, by calculating a minimum DC link voltage required by the DC-AC converter to generate AC power for the AC grid and regulating that DC link voltage, and (iii) disabling the boost circuit of one array (provided the Vmpp is equal to or greater then the minimum calculated DC Link voltage required).

The PV inverter 10 may receive DC power from one or more independent PV arrays 12 each coupled to a DC input section 18 of the inverter. The DC input section 18 of the inverter determines the voltage (Vmpp) corresponding to the maximum power output of each of the PV arrays, draws power from each array at the Vmpp and, when needed, boosts the incoming DC voltage from each PV array up to a higher voltage needed for inversion to an AC voltage suitable for the AC grid 14. The DC power is converted to AC power by a DC link circuit 19 that outputs the AC power to the AC grid 14.

The DC input section 18 may include an input connection switch 20 for each connection to a PV array 12. The connection switch 20 is controlled by the system controller 16 for the PV inverter. The DC power output by each PV array to the PV inverter is monitored by a measurement system 44 that measures a voltage difference across each connection switch. The measurement system may also monitor for ground faults in the PV arrays and connection switches using a ground fault (GF) sensor 24.

A separate boost circuit 26, e.g., a set of transistor switches 28, for each PV array is provided in the DC input section. The PV inverter may be connected to multiple (N) PV arrays. Each of the N PV arrays is connected to an independent boost circuit. The boost circuit dedicated to the PV array allows that array to be operated at its MPP and Vmpp.

The boost circuit increases the DC output voltage above the voltage level provided by the PV array. The boost circuit is used when the DC voltage required by the DC link circuit 19 is higher than the DC output voltage from the PV array. The boost circuit is disabled, when the PV array produces DC power at a voltage level at or higher than the DC input voltage needed by the DC link circuit.

When the Vmpp (Voltage Maximum Power Point) is less then the minimum allowable DC link voltage, the array input will be boosted to the minimum DC link voltage. This allows the boost circuit input to be set at the Vmpp to obtain the maximum power from the PV array while providing a DC link voltage sufficient to enable the DC-AC inverter to generate AC power to distribute to the AC grid.

The boost circuit 26 may be configured as a buck-boost (step up) circuit that includes transistor switches 28 that turn ON-OFF the DC power from each PV array based on a pulse duty cycle provided by a pulse generator 30. The duty cycle is determined by a boost control software routine 31 in the system controller 16. Current is boosted by accumulating energy in inductors 32 during an OFF portion of the duty cycle and, during the ON portion of the cycle, applying the energy from both the PV array and the inductor to the remaining portion of the PV inverter. When the switches 28 are closed (corresponding to the OFF portion of the duty cycle), energy from the PV arrays accumulates in the inductors 32 but is not applied to DC link circuit 19. When the switches are open (corresponding to the ON portion of the duty cycle), DC power from the PV arrays and the inductors is applied to capacitors 34 and the DC link circuit 19. Diodes 33 prevent reverse flow of current from the capacitors 34. The resulting output DC voltage level from the boost circuit 26 (across circuit point 36) is higher than the DC voltage from the PV arrays. The ratio of the DC voltage level output by and input to the boost circuit 26 is proportional to the ratio of the entire duty cycle divided by the ON portion of the cycle. Typically, the greatest effective boost in voltage is achieved with a duty cycle in which the switches are open one-half of the cycle (50-50 cycle).

Boosting of the PV voltage level from that output by the PV arrays reduces the DC power, due to the switching of the DC voltage ON and OFF during the duty cycle. The reduction in power degrades the efficiency of the PV inverter 10. The boost control system 31 minimizes the power and efficiency losses by operating the P arrays at their Vmpps and disabling the boost circuit for any PV array having a Vmpp equal to or greater than the DC link voltage. The boost circuits are disabled without shifting the operation point of the PV arrays away from the Vmpp for the array. Disabling one or more of the boost circuits reduces the switching losses otherwise attributable to the boost circuit and thereby improves the overall efficiency of the inverter.

The DC link circuit 19 includes an inverter circuit 37 that "chops" the DC power from the boost circuits to form AC power. The inverter circuit 37 may be arranged as an "H-Bridge" inverter circuit having transistor switches 38 each arranged in parallel with a diode. The pulse generator 30 turns the switches 38 in accordance with a duty cycle. The duty cycle is determined by an inverter control 40 software routine that configures the duty cycle to produce AC power of sufficient voltage and current for the AC grid 14 based on the DC power from the boost circuits.

The duty cycle for the inverter circuit typically alternatively switches one pair of the four switches 30 ON and the other pair of switches OFF. The pairs of switches are diagonal to one another in the H pattern of the four switches. By alternatively turning ON and OFF the pairs of switches, the DC link circuit 19 inverts the polarity of the DC voltage being output by the DC input section 18 to the PV inverter. The sequential inversion of the DC voltage creates an AC voltage that is output as AC power.

The DC link circuit includes an AC line filter 42 to remove noise and other extraneous signals in the AC power output by the DC link circuit. The AC power is also synchronized with the AC power in the grid 14 using the PLL and anti-islanding routine 56. The synchronization may be achieved synchronizing the duty cycle in the inverter to the AC power in the grid. A measurement system 44 monitors the AC output power, whether the PC inverter 10 is connected to the AC utility grid 14, and the DC power input by the PV arrays. A system control 50 operates a relay 43 that connects the PV inverter 10 to the AC grid 14 and relays in the connection switch 20 that couples the PV arrays to the PV inverter. A DC bus control algorithm 54 regulates the connections of the PV arrays to the PV inverter.

In addition, the measurement system 44 generates status signals that are input to a fault detection system 46, which also monitors the ground fault interrupt circuit 24. The fault detector 46 generates output signals that are directed to a protection and system function monitoring software routine 48. In certain instances, the protection and system function monitoring software may generate a command to a system control device 50 to disconnect the PV inverter from one or both of the PV arrays 12 and AC grid 14.

The control system 16 preferably operates the PV inverter at its maximum power point (MPP). To determine the MPP for the PV arrays, the control system 16 executes a Maximum Power Point Tracking (MPPT) software routine 52 to periodically identify the Vmpp for each PV array 12 connected to the PV inverter. With the Vmpp identified, the control system regulates PV inverter, e.g., boost circuit and DC-AC inverter, to maintain each PV array at its Vmpp.

The Vmpp changes during the day for each PV array. The maximum power point and corresponding Vmpp for each PV array varies during the daylight hours with changes in the amount of sunlight received by the array. The Vmpp varies slowly as the sun rises and sets during a day and varies quickly when clouds pass in front of the sun. The Vmpp for each PV array is periodically updated using optimization processes that fine tune the Vmpp nearly continuously, e.g., every 0.1 seconds, and check for large changes in the Vmpp periodically, e.g., every 30 minutes.

To improve the efficiency of the DC input section 18, the boost circuit 26 for a PV array is disabled when the voltage level (Vmpp) of the array is at least at the minimum DC voltage level needed by the DC link circuit 19. Disabling one or more of the boost circuits reduces the efficiency losses that inherently occur when operating boost circuits. When the boost circuit is disabled the voltage output of the corresponding PV array is regulated by the DC-AC inverter.

Further, the DC link voltage is periodically recalculated to determine if the voltage can be reduced from a default DC link voltage. Minimizing the DC link voltage reduces the level of the DV voltage needed from the PV arrays. By reducing the needed DC link voltage, it is more likely that the Vmpp for one or more of the PV arrays is at or above the needed minimum DC link voltage. If the Vmpp for an array is at or above the minimum DC link voltage, the boost circuit for that PV array may be disabled. Periodically determining a minimum DC link voltage allows the boost circuit(s) to be disabled more often.

FIGS. 2 to 5 are a flow chart showing some steps for operation of the PV inverter 10. In Step 100 occurs just before dawn when there is no or minimal sunlight shining on the PV arrays. The DC link circuit is off and the DC link voltage is set to zero. As the sun begins to rise, the PV arrays start generating DC power, in step 102. The initial DC power from the PV arrays is minimal. The increase in DC power as more sunlight reaches the arrays is monitored by the measurement system 44. The controller 16 may be in a reset, hibernation or other standby mode until the PV arrays begin generating DC power or more than a minimal amount of power. The measurement circuit 44 may prompt the controller 16 to become active and come out of the standby mode when the DC power generated by the PV arrays increases beyond a threshold voltage or power level, e.g., 180 volts, in step 104. The threshold voltage or power level may be an initial setting for the minimum DC link voltage. This initial DC power setting is used while the PV inverter 10 is powered up and made ready to produce AC power for the grid 14. The initial setting is at a DC voltage level below that needed by the DC link circuit to provide AC power to the AC grid.

In step 106, the DC power from the PV arrays, which is now above the threshold, is applied to the DC input circuit 18 and, particularly, to the boost circuit 26. The boost control routine 31 in the controller 16 adjusts the boost circuit, e.g., the duty cycle, to draw power from the PV arrays and step up the DC power from the PV arrays to a higher DC voltage level, in step 108. The PV arrays are not controlled to run at maximum power output during this startup phase. When the stepped up DC voltage level reaches a predefined DC link voltage, e.g., 425 volts, a relay 43 is closed by the system control 50 to connect the PV inverter 10 to the AC grid 14, in step 110. Once the relay 43 is closed, a check is make to confirm that the PV inverter is electrically connected to the AC grid and that the inverter is not merely supplying power to a localized area, e.g., islanding. Expiration of an anti-islanding timer, which is governed by the phase lock loop (PLL) and anti-islanding routine 56, confirms that the PV inverter is connected to the AC grid, in step 112.

Also in step 112, the boost circuit is fully enabled and the DC input circuit starts executing the MPPT routine 52 to determine a maximum voltage output of the PV arrays. The PV arrays are not initially operated at their Vmpp but are rather operated at their maximum output voltage. The duty cycle for the boost circuit is reduced by the boost control routine 31 to achieve to a maximum DC voltage output from the boost circuit, in step 116. The maximum DC voltage is used to quickly reach the DC link voltage required to generate AC power for the AC grid. The maximum DC voltage does not necessarily correspond to the maximum power output or Vmpp of the PV arrays.

As the sun rises, the amount sunlight reaching the PV arrays increases and the PV arrays increase their DC output power. The boost circuit continues to step up the DC voltage until the boosted DC voltage reaches a threshold DC link voltage, e.g., 500 volts in step 118. The AC inverter is enabled when the DC voltage output from the boost circuit to the DC link circuit reaches the threshold level, in step 120. As the AC inverter is enabled, the inverter converts the DC link input voltage to AC power suitable for the grid, such as between 220 to 240 AC volts and 15 amperes, in step 122. The AC inverter also synchronizes the generated AC power with the AC power in the grid, in step 124.

The efficiency of the PV inverter is degraded due to the boost circuits in step 126. To optimize the efficiency, the PV inverter disables one or more of the boost circuits when the Vmpp of the one or more PV arrays reach the minimum DC link voltage. Disabling a boost circuit eliminates the inefficiency that occurs when the boost circuit is enabled and switching losses occur.

Another technique for improving the efficiency of the PV inverter is to reduce the DC link voltage. Switching losses in the inverter are directly related to the magnitude of the DC link voltage. Minimization of the DC link voltage for a given set of operating conditions reduces switching losses and increases efficiency of the inverter.

To enhance the efficiency of the PV arrays, the MPPT routine periodically determines the maximum power point and Vmpp for each array. To determine the Vmpp, the MPPT routine causes the voltage output from an array to sweep from a low value to a high value and monitors the resulting current from the array. Power is determined from the product of the voltage and current. The MPPT routine determines the maximum power point (MPP) for a large range of voltages of the array. The array voltage corresponding to the maximum power is the Vmpp and is set as the operating point of the array.

In general, the maximum power point is determined by periodically sweeping the entire voltage range of a PV array and identifying the voltage (Vmpp) corresponding to the maximum power point of the array. Between the periodic determinations of Vmpp by sweeping the voltage levels, the Vmpp is adjusted by dithering, e.g., by shifting the array voltage from the Vmpp, e.g., by 0.1 volts, and the resulting power due to the voltage shift is compared to the array power at the Vmpp. If the PV array at the shifted voltage produces a higher than at the Vmpp, the shifted voltage level is set as the Vmpp and the array is operated at the new Vmpp. The dithering of the Vmpp may be performed frequently, e.g., every 0.1 seconds. Step 128.

In particular, the MPP and boost control algorithms control the pulse generator to vary the voltages from each PV array through a sweep of operating voltages. To initialize the sweep operation, the DC link voltage, e.g., output voltage of the boost circuit, is set to a constant, such as 500 volts, in step 130. The controller then stops the duty cycle applied to the boost circuit so that the PV array output voltage is applied without a boost to the DC link voltage output, in step 132. The power output of the PV array is determined by measuring the current from the PV array. The power is the product of the measured current and the voltage output of the PV array, as shown in step 134.

To sweep the voltage output of the PV array across an operating range of voltages, the controller causes the pulse generator to vary the duty cycle applied by the boost circuit across a range of duty cycles, such as from a cycle in which the transistors are always OFF to a cycle in with the transistors are each switch ON one-half of each cycle (50-50 duty cycle), in step 136. As the duty cycle is varied from always OFF to a 50-50 cycle, the measurement system 44 and controller 16 monitor the current and voltage output of by the PV array, in step 138. The output voltage of the PV array drops as the duty cycle increases the amount of time that the PV array is loaded by the minimum DC link circuit. By increasing the duty cycle, the voltage output of the PV array can be swept through an operating range of voltages for the PV array. As the voltage output of the PV array is swept, the measurement unit measures current and the controller determines the PV array power output as the product of the output voltage and corresponding current, in step 138. Based on the determined power output of the PV array for its operating range of voltages, the controller determines the maximum power output (MPP) and corresponding voltage (Vmpp) for the array. In addition, the controller determines the duty cycle for the boost circuit that corresponds to the MPP and Vmpp, in step 140.

The above described process of determining MPP, disabling a boost circuit if the Vmpp of its corresponding PV array is greater than the DC link voltage and minimizing the DC link voltage is periodically repeated, such as every 30 minutes, in step 142.

In addition to periodically sweeping the entire range of PV voltages to determine MPP and Vmpp, the controller may fine tune the Vmpp on a nearly continuous basis. The Vmpp is fine tuned by making small changes to the PV array voltage and checking whether the array power has increased. In particular, the PV voltage is dithered about the Vmpp, e.g., by shifting the array voltage around from the Vmpp, e.g., by plus and minus (+/−) 0.1 to 0.05 volts, in step 144. The controller monitors the power output from the PV array after making the small voltage change. The PV array power at the shifted voltage is compared to the array power at the Vmpp. If the power of the PV array at the shifted voltage is higher than at the Vmpp, the shifted voltage level is set as the Vmpp and the array is operated at the new Vmpp, in step 146. The dithering of the Vmpp may be performed frequently, e.g., every 0.1 or 0.05 seconds in step 128.

When the Vmpp of a PV array is less than the minimum allowable DC link voltage, the voltage output of the array is boosted by applying the duty cycle determined a corresponding to the Vmpp. The voltage output is boosted to the DC link voltage, in step 142. By setting the duty cycle for the array correspond to the Vmpp and minimum DC link voltage, the boost circuit can draw the maximum power (MPP) from the PV array and provide a boosted DC voltage sufficient for the DC link circuit, in step 142.

By continually updating the Vmpp for each array (by periodically sweeping the voltage range of the PV array and continually dithering the Vmpp), the PV arrays can be operated at their current Vmpp. The efficiency of the PV inverter is enhanced by operating the PV arrays at their current Vmpp.

The efficiency of the PV inverter may also be increased by disabling a boost circuit. If the Vmpp of a PV array is greater than the minimum allowable DC link voltage, the boost circuit for that PV array is disabled in step 144. The controller disables the boost circuit by holding the transistor switches 28 in an open position to apply DC power from the PV array directly to the DC link circuit and effectively bypassing the boost circuit. When the boost circuit is disabled, the Vmpp for the PV array is regulated by the DC-AC inverter 37 of the DC link circuit, in step 146. The inverter adjusts the DC link voltage, which is the DC input to the inverter, to match the Vmpp of the PV array. For those PV arrays having Vmpp below the reduced DC link voltage, their respective boost circuits continue to increase their voltage.

If more then one PV array has a Vmpp greater than the minimum DC link voltage, the DC link voltage is set by the inverter circuit to be the greatest Vmpp value. The boost circuit is disabled for the PV array having the greatest Vmpp. The boost circuits for other PV arrays are enabled and boost the voltages of their respective array to the greatest Vmpp value. Further, the duty cycle applied to the DC-AC inverter is adjusted to accommodate the greatest Vmpp as the new DC link voltage.

If needed, to limit the input power from a PV array having a Vmpp above the DC link voltage and with a disabled boost circuit, the MPPT may to raise or lower the voltage output of that array to a reference voltage (Vref) that is greater or lower than the Vmpp. The Vref outputted by the PV array is applied as the dc link voltage, provided that the Vref is greater than the minimum allowable DC link voltage. The MPPT may adjust the duty cycle applied by the inverter to limit regulate the PV array to the Vref.

Another technique for improving the efficiency of the PV inverter is to reduce the DC link voltage. Switching losses in the inverter are directly related to the magnitude of the DC link voltage. Minimization of the DC link voltage for a given set of operating conditions reduces switching losses and increases efficiency.

Before reducing the DC link voltage, the controller determines a minimum allowable DC link voltage for each cycle, e.g. 50 Hertz (Hz) or 60 Hz, of the AC power in the grid, in step 148. To determine the minimum allowable DC link voltage, the AC output voltage of the PV inverter is measured and added to the output of the voltage across the filter inductor 42 using vector analysis. The result of the vector analysis is divided by the maximum switching duty cycle of the DC-AC inverter. The switching devices in the inverter have a minimum OFF time specification. Based on the switching frequency and the minimum OFF time, a maximum duty cycle can be calculated. The result of the division of the vector analysis and maximum switching duty cycle yields a calculated minimum dc link voltage.

For each AC cycle, the maximum measured AC voltage is recorded by the controller and the maximum monitored firing duty cycle of the DC-AC inverter is measured and recorded. From these two recorded values, the minimum DC link voltage is calculated and continuously adjusted. The minimum DC link voltage is then used to determine if any of arrays have a Vmpp sufficiently high to disable its boost circuit, in step 150.

The PV inverter disclosed here is believed to provide several technical effect advantages (effects) for conversion of DC power generated from PV arrays to AC power suitable for a power utility grid. One technical effect advantage is reduction in power losses for an N input PV static power converter (SPC) while maintaining MPPT capability on all inputs. Another technical effect advantage is providing MPPT in a N input SPC using the inverter to provide MPPT on one input and MPPT on the other inputs using an input boost or conversion stage. A further technical effect advantage is increased DC to AC conversion efficiency by continuously adjusting the DC link voltage based on operating conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to increase photovoltaic (PV) inverter efficiency by disabling a DC-DC boost comprising:
    applying DC power generated by a PV array to the PV inverter;
    boosting the DC power from the PV array from a predetermined voltage level to a predetermine DC link voltage, wherein the PV array is regulated by the boosting to output a voltage at the predetermined voltage level;
    converting the boosted DC power to AC power;
    disabling the boost of the DC power from the PV array while the PV array outputs a DC voltage level at least as great as the predetermined DC link voltage, and
    converting the DC power generated by the PV array to AC power while the boost is disabled.

2. The method of claim 1 wherein the AC power is compatible with AC power in a power utility grid.

3. The method of claim 1 wherein the predetermined voltage level for the PV array corresponds to a maximum power output of the PV array and the method further includes periodically determining the maximum power output of the PV array.

4. The method of claim 1 wherein the boosting is by a DC boost circuit having at least one switch transistor and the switch transistor is controlled by a duty cycle, wherein the method further comprises determining a duty cycle to operate the PV array at the predetermined voltage level.

5. The method of claim 1 wherein the conversion of the boosted DC power to AC power includes regulating the PV array by disabling the boosting to output a maximum power voltage corresponding to a maximum power of the array.

6. The method of claim 1 wherein the array is a first PV array and power from an additional PV array is input to the PV inverter, and separately boosting the power from each of the additional PV array while disabling the boost by the first PV array, wherein the predetermined DC link voltage is a maximum power voltage for the first PV array.

7. A method to convert direct current (DC) power generated by a plurality of photovoltaic (PV) arrays to alternating current (AC) power using a PV inverter having a DC boost circuit for each of the PV arrays and a DC to AC inverter, the method comprising:
    applying the DC power generated by each PV array to an input to the PV inverter corresponding to the PV array;
    operating each PV array at a maximum power voltage corresponding to a maximum power output of the array to produce DC power;
    determining a duty cycle for each PV array which regulates the PV array to output the maximum power voltage for the array and boosts the maximum power voltage to at least a minimum DC link voltage;
    applying the duty cycle to each boost circuit to boost the DC power from the array connected to the boost circuit from the maximum power voltage of the array to at least the minimum DC link voltage;
    converting the boosted DC power to AC power, and
    disabling the boost circuit connected to a one of the PV arrays having reached a maximum power voltage at least as great as the minimum DC link voltage.

8. The method of claim 7 wherein the AC power is compatible with AC power in a power utility grid.

9. The method of claim 8 further periodically calculating the minimum DC link based on the AC power in the power utility grid.

10. The method of claim 7 further comprising periodically updating the maximum power voltage and determining the duty cycle for the updated maximum power voltage.

11. The method of claim 7 wherein the conversion of the boosted DC power to AC power includes regulating the one array with the disabled boost to output a maximum power voltage corresponding to a maximum power of the one array.

12. A photovoltaic inverter comprising:
    a plurality of input connections each adapted to receive direct current (DC) power from a photovoltaic array;
    a separate DC boost circuit electrically connected to each of the input connections, wherein the boost circuit includes at least one switch operated in accordance with a duty cycle;
    a DC link circuit electrically connected to a DC output from each of the DC boost circuits, wherein the DC link circuit includes a DC to alternating current (AC) inverter and an AC power output adapted to deliver AC power from an AC power grid, and
    a controller executing processes for: determining a voltage at which each of the photovoltaic arrays connected to an input connection produces a predetermined power; generating the duty cycle for each boost circuit to control the at least one switch to cause the PV array to produce the predetermined power and the boost circuit to output a predetermined DC link voltage, and disabling one of the boost circuits coupled to a PV array generating a voltage greater than the predetermined DC link voltage while the voltage from the PV array generating the voltage greater than the predetermined DC link voltage is being converted to AC power.

13. The photovoltaic inverter of claim 12 wherein the predetermined power is a maximum power for the photovoltaic array.

14. The photovoltaic inverter of claim 12 wherein the AC inverter is a bridge circuit.

15. The photovoltaic inverter of claim 12 wherein the boost circuits each includes an inductor and capacitor.

16. A method to determine, on an ongoing basis, a maximum power point for a photovoltaic array, the method comprising:

a. varying a voltage output of the photovoltaic array over an operating range of voltages for the array;
b. measuring current output from the photovoltaic array as the voltage output is varied over the operating array;
c. using the measured current and the voltage corresponding to the measured current to determine a power output of the array for each of the various voltages in the operating range;
d. selecting a maximum power output from the power outputs in the operating range and designating a corresponding voltage as a voltage at maximum power point (Vmpp) for the array;
e. periodically repeating steps (a) to (d) to update Vmpp;
f. operating the photovoltaic array at the Vmpp;
g. dithering the Vmpp by slightly shifting the voltage of the array away from the Vmpp, and
h. if the power output of the array at the shifted voltage is greater than the power output of the array at Vmpp, designating the shifted voltage as the Vmpp and repeating steps (f) to (h).

17. The method of claim 16 wherein the Vmpp is periodically updated every 15 to 60 minutes and the Vmpp is dithered at least every one second.

18. The method of claim 17 wherein the Vmpp is dithered at least every tenth of a second.

19. The method of claim 16 wherein the varying of the voltage output of the photovoltaic array is performed by varying a duty cycle of a boost circuit coupled to the array.

20. The method of claim 19 wherein the duty cycle is varied from a cycle in which switches in the boost circuit are off to a cycle in which the duty cycle.

21. A method comprising:
applying DC power generated by a photovoltaic (PV) array to a PV inverter circuit;
boosting the DC power to a predetermine DC link voltage, while a DC voltage output by the PV array is below a predetermined threshold level;
converting the boosted DC power to AC power, and
while the PV array outputs a DC voltage level at least as high as the threshold level, disabling the boost of the DC power and converting the DC power generated by the PV array to AC power while the boost is disabled.

\* \* \* \* \*